US012347040B2

(12) United States Patent
Silverman et al.

(10) Patent No.: US 12,347,040 B2
(45) Date of Patent: Jul. 1, 2025

(54) CONTROLLING APPLICATION STATE IN A MIXED REALITY INSTALLATION

(71) Applicant: Microsoft Technology Licensing, LLC, Redmond, WA (US)

(72) Inventors: David Ben Silverman, Kirkland, WA (US); Joshua G. Wittner, Woodinville, WA (US); Steven Mark Liss, Issaquah, WA (US); Catherine Roiter, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 17/852,322

(22) Filed: Jun. 28, 2022

(65) Prior Publication Data

US 2023/0343039 A1 Oct. 26, 2023

Related U.S. Application Data

(60) Provisional application No. 63/334,646, filed on Apr. 25, 2022.

(51) Int. Cl.
*G06T 19/00* (2011.01)
*G06F 3/01* (2006.01)
*G06T 15/00* (2011.01)

(52) U.S. Cl.
CPC ............ *G06T 19/006* (2013.01); *G06F 3/013* (2013.01); *G06T 15/005* (2013.01)

(58) Field of Classification Search
CPC ..... G06T 19/006; G06T 15/005; G06F 3/013; G06F 3/011; G06F 3/012
See application file for complete search history.

(56) References Cited

U.S. PATENT DOCUMENTS 10,204,264 B1* 2/2019 Gallagher ........ H04N 21/25891
2021/0056306 A1* 2/2021 Hu ........................ G06V 40/193

OTHER PUBLICATIONS

"BoundingSphere", Retrieved from: https://docs.unity3d.com/ScriptReference/BoundingSphere.html, Retrieved on Jul. 5, 2022, 2 Pages.
"BoxCollider", Retrieved from: https://docs.unity3d.com/ScriptReference/BoxCollider.html, Retrieved on Jul. 5, 2022, 2 Pages.
"CapsuleCollider", Retrieved from: https://docs.unity3d.com/ScriptReference/CapsuleCollider.html, Retrieved on Jul. 5, 2022, 2 Pages.
"Collider.Raycast", Retrieved from: https://docs.unity3d.com/ScriptReference/Collider.Raycast.html, Retrieved on Jul. 5, 2022, 2 Pages.
"Unity Announces Support for Microsoft Hololens", Retrieved from: https://unity.com/our-company/newsroom/unity-announces-support-microsoft-hololens, Apr. 29, 2015, 2 Pages.

* cited by examiner

*Primary Examiner* — Chong Wu
(74) *Attorney, Agent, or Firm* — Barta Jones, PLLC

(57) ABSTRACT

A system and computerized method for rendering content in a mixed reality installations is provided. The method includes identifying a mixed reality space containing a user position of a user, determining a user gaze direction of the user via a user device, identifying a view volume intersecting the user gaze direction while the user is in the mixed reality space, determining that the view volume is associated with the mixed reality space, and selecting a content entity associated with the view volume to render to the user via the user device.

20 Claims, 11 Drawing Sheets

CONTROLLING APPLICATION STATE IN A MIXED REALITY INSTALLATION

CROSS-REFERENCE TO RELATED APPLICATION

This application claims priority to U.S. Provisional Patent Application No. 63/334,646 entitled "CONTROLLING APPLICATION STATE IN A MIXED REALITY INSTALLATION ACROSS MANY DEVICES" filed on Apr. 25, 2022. The above-identified provisional patent application is hereby incorporated by reference in its entirety.

BACKGROUND

A mixed reality experience, or installation, utilizes a library of content which is triggered at the correct time and place in order for a user to experience the mixed reality experience as intended. Many conventional mixed reality experiences rely on manual inputs received from a user or a simple timing mechanism to change the application state and trigger appropriate content or stimuli. These mixed reality experiences that depend on manual inputs from a user may result in the user triggering content accidentally and/or incorrect content being presented. Further, timing-based mixed reality experiences require the user to move through the installation at a fixed pace and therefore do not accommodate differences in user locomotion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and computerized method for rendering content in a mixed reality installation is provided. The method includes detecting a first user position of a user; from a set of mixed reality spaces, determining a first mixed reality space in which the first user position is contained based on the detected first user position; while the user is in the determined first mixed reality space, detecting a first user gaze direction of the user via the user device; from a set of view volumes, determining a first view volume, the first view volume intersecting with the first user gaze direction; and based on determining that the first view volume is associated with the first mixed reality space, identifying a content entity associated with the first view volume to render to the user via the user device.

A system and computerized method for creating mixed reality installations is provided. The method includes creating a set of mixed reality spaces via a device of a plurality of devices, wherein each space is a polygon comprising a set of boundaries; creating a plurality of volumes, wherein each volume of the plurality of volumes is a three-dimensional (3D) shape comprising a set of points, and wherein each volume corresponds to a content entity; adjusting a mixed reality space of the set of mixed reality spaces by moving the set of boundaries using a user interface; adjusting a volume of the plurality of volumes by moving the set of points using the user interface; and sharing at least one of the set of mixed reality spaces or the set of volumes from the device to the plurality of devices.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 9, the systems are illustrated as schematic drawings. The drawings may not be to scale.

DETAILED DESCRIPTION

Figure 1:
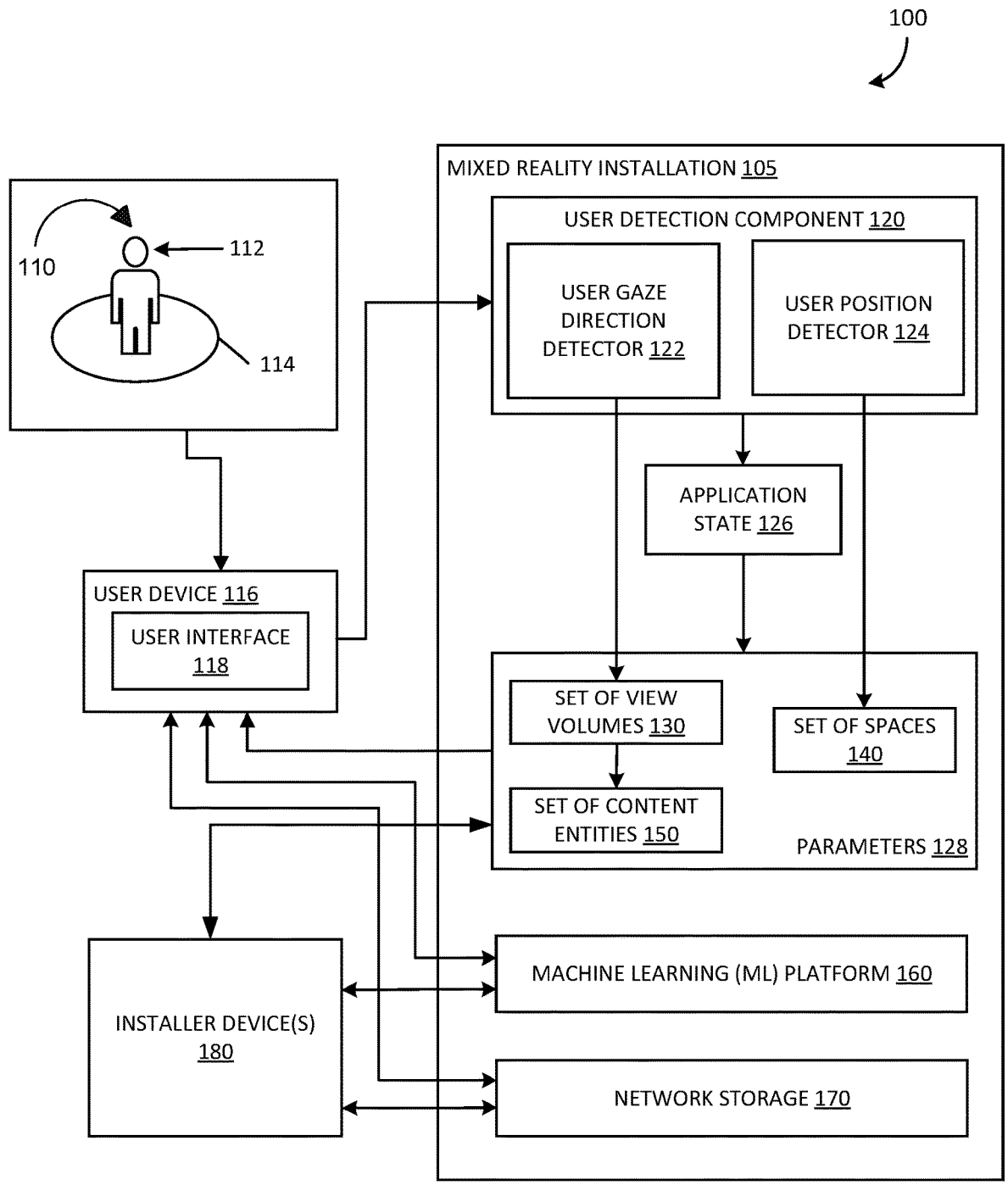
FIG. 1 is a block diagram illustrating a system configured to control application state of a mixed reality installation.

As described herein, mixed reality experiences utilize a library of content that must be triggered at the correct time and place in order for a user to experience the mixed reality installation as intended by a developer of the installation. These experiences face several challenges, for example such as triggering content at the correct time, correct place, and consistent with the intention of the user, particularly where the user does not move through a particular experience in the ideal locations, speed, and so forth.

Aspects of the present disclosure provide computerized systems and methods for controlling an application state in a mixed reality installation. In some examples, a mixed reality installation may be installed in a physical location where a user may enter and experience content of the mixed reality installation. In other examples, the mixed reality installation may be installed in a physical location other than where the user may enter and experience content of the mixed reality installation. As referenced herein, a mixed reality installation may be presented by a computer-controlled device or a set of computer-controlled devices that augment one or more of a user's senses with additional sensory stimulus, such as auditory, visual, kinetic, holographic, or other stimulus that is not otherwise provided in the space of the physical location where the user is positioned. In some examples, a mixed reality installation is a mixture of virtual and real environments. In some examples, a mixed reality installation may include environments where a visual device may be utilized. In some examples, a mixed reality installation may include digitally augmented physical spaces where a user may wear a head-mounted display (HMD) and interact with three-dimensional (3D) content. In some examples, a mixed reality installation may include digitally augmented physical spaces where a user may interact with holographic content. These are illustrative examples of environments of a mixed reality installation and aspects of the disclosure are not limited to these examples.

The mixed reality installation may include environments where an audio device, a visual device, or both may be utilized. For example, the mixed reality installation may include a museum environment where a user carries an audio device with pre-recorded tour guide information and/or carries or wears a visual device that presents visual information to the user based on the position in the museum and the gaze of the user. In another example, the mixed reality installation may be an educational environment, where an educational service is launched on a student or teacher's audio or visual device upon the student or teacher entering a particular area, such as a classroom. In another example, the mixed reality installation may be a mobile environment, where as a user approaches a particular landmark, the user's audio or visual device presents information corresponding to the landmark. In one example, the mixed reality installation may be a real estate environment that, upon a particular piece of real estate being detected within the environment, the device presents audio and/or visual information regarding the piece of real estate including address, square footage, price, and so forth. In another example, the mixed reality installation may be a dining environment that, upon a particular restaurant being detected within the environment, the device presents audio and/or visual information regarding the restaurant including a menu, reviews, health and safety information, operating hours, and so forth. However, it should be understood that the examples presented herein are for illustration only. The mixed reality installation for use in the present disclosure may be applied to one of many different environments without departing from the scope of the present disclosure.

Examples of the present disclosure enable a user transparent system for controlling application state in a mixed reality installation across many devices. In some examples, a user detection component uses 3D geometric algorithms to understand where the user is presently focusing their attention and to predict the intention of the user. In some examples, the user detection component detects a user's position and gaze direction and then uses this information to control the application state and trigger the correct content. By using the user's position and gaze direction, the correct content may be triggered at a time when the user is in an appropriate position and able to intentionally see the content. In addition, the user detection component is capable of detecting the user's position and gaze direction to control the application state and eliminates the need for a specific user input, such as pushing a button, scanning fiducial markers, voicing a command, or activating any other type of user interface, to be received in order to experience the mixed reality installation. This also eliminates the need to track the users using user inputs throughout the physical space and for any external sensors (e.g., external to the HMD or other user device) to detect user movement throughout the mixed reality installation. Thus, the mixed reality installation may be executed corresponding to the physical space the user is tracked within.

In some examples, a mixed reality installation area may be segmented into multiple areas, also referred to herein as mixed reality spaces. The present disclosure is operable with multiple mixed reality spaces throughout different physical rooms or in a single physical room. Each mixed reality space may be defined in two-dimensional (2D) space or in 3D space. For readability, some examples herein describe the mixed reality space as being defined by a polygon, though this does not imply that the examples are limited to a 2D space.

A polygon containment check is used against the user's position in the physical space to determine the user's presence within the mixed reality space. By tracking the user's presence in relation to the user's location in the physical space, the system calculates the user's proximity to a location where the user is expected to engage with the mixed reality content. In some examples, the containment check comprises determining the user's position via a device of the user, e.g., a headset, a mobile device, and so forth, comparing the determined position to the boundaries of a mixed reality space, and determining whether the determined position is contained within the boundaries of the mixed reality space based on the comparison.

To ensure a content entity is triggered within the user's field of view and not solely on physically crossing into a particular mixed reality space, volumes called view volumes are employed. A view volume may be invisible to the user through the headset and may be defined by any 2D or 3D shapes, such as a rectangle, sphere, rectangular prism, triangle mesh, or other polygon. A ray intersection, constructed from the gaze direction of the user, is used against these view volumes to determine whether the user intends to be looking in the direction where mixed reality content is supposed to be activated and displayed, or rendered. In some examples, the combination of the user's determined presence in a mixed reality space at the same time as the intersection of the user's gaze with a view volume is a trigger to control the software application state and to activate a content entity corresponding the view volume. In other words, if the user is within the boundaries of the mixed reality space and the gaze is determined to intersect a view volume, then content associated with the view volume is activated and rendered to the user. This enables users to enjoy the mixed reality installation by activating content through a series of view volumes at an individual pace for the particular user and even their own order if intended by the designer of the application state.

As described herein, one or more defined polygons are implemented to control the application state, which enables seamless and intentional display of content even when the physical space is separated by a barrier. For example, in a mixed reality installation where two independent sets of content are close to each other in physical space but are separated by a physical barrier, such as a wall, only the content that is on the same side of the wall as the user is intended to be presented regardless of distance. A conventional mixed reality installation may not be able to make this distinction with the user proximity information alone. Thus, examples of the present disclosure allow a mixed reality space to be designed with boundaries that conform to the real-world physical wall and create a trigger that aligns with the physical wall. Further, because aspects of this disclosure allow using both user's gaze direction and user's position to control application state, only content that corresponds to the side of the barrier the user may be activated.

As referenced herein, polygons are implemented to determine boundaries of mixed reality spaces. The total number of comparisons needed to determine containment may be referenced as O(n), where n is the number of vertices making up all polygonal boundaries. The use of the polygons to determine the boundaries of the mixed reality spaces has several benefits. For example, boundaries of a polygon may be created such that they match many kinds of real-world geometric shapes. This is particularly useful in cases where real-world geometry is non-rectilinear. In addition, these boundaries may be built and tested in advance off-site from the physical location where the mixed reality installation would be installed, then adjusted on-site to ensure close approximation to the real-world space, even if there are differences between blueprint and final construction dimensions. Further, because updates to the boundaries may be transmitted in real time to other devices, the on-site adjustment enables rapid and efficient adjustment and updating, rather than installing and/or updating each individual device unit individually.

For example, some implementations of the present disclosure enable a method for installers with no prior knowledge or experience of the mixed reality installation technology to adjust mixed reality spaces and view volumes on-site. Mixed reality spaces and view volumes may be laid out in a 3D design application and adjusted later in the 3D virtual space as they are aligned to the physical installation space. This allows a designer to specify a 3D virtual content map in a user interface, such as a low code/no code user interface, which will overlap and align to a footprint or floorplan of the physical space. In a case where a priori schematics do not align with spaces as built, or changes are introduced between the time when a designer creates the 3D virtual content and when the mixed reality installation is installed into the physical space, some aspects of this disclosure allow a non-technical user, who may or may not have prior coding experience, to adjust mixed reality space boundaries and view volume properties in an intuitive way. For example, an installer can utilize hand gestures including, but not limited to, drag and drop, pinch and move, and so forth via a low code/no code user interface to define or adjust the mixed reality spaces and view volumes. In some examples, if boundaries of mixed reality spaces and properties of view volumes as initially specified do not align with the physical space, the boundaries and properties may be modified and adjusted easily with little cost to realign the content triggers correctly. In some examples, an operator may be enabled to install and adjust the installation without any prior professional knowledge or experience on mixed reality installations.

In some examples, a head-mounted device (HMD) may be advantageously implemented to adjust or modify a mixed reality installation. An HMD or wearable glasses, including sunglasses, with hand-tracking capabilities may allow an installer to simply "grab" boundary points of mixed reality spaces with their hand or hands and move the boundary points to a new location. The boundary is then automatically recalculated based on the updated boundary points. Similarly, view volumes may be moved and reshaped with intuitive hand gestures. This enables dynamic reshaping of mixed reality space boundaries and volume visualization based on manual manipulation by an operator or installer with immediate feedback.

As described herein, the ease of adjusting and modifying the mixed reality installation allows the mixed reality installation application to be designed off-site from the physical location where the mixed reality installation will be installed. Designing of the mixed reality installation may include, but is not limited to, defining boundaries of mixed reality spaces that the mixed reality installation comprises, defining shapes and properties of view volumes, creating content to be displayed on the view volumes, and setting triggers to activate the content. Designing and updating of the mixed reality installation may be done entirely off-site, partly off-site and partly on-site, or entirely on-site.

Some aspects of the present disclosure provide network storage that allows trigger information to be shared across a large deployment of devices. In some examples, all devices used for the mixed reality installation share the same data to ensure uniformity. The dynamic network storage may be used to install the mixed reality application on any number of devices simultaneously. Additionally, the dynamic network storage further allows any subsequent modifications to be shared across any number of devices. In some examples, a network storage mechanism is used so that the experience through the mixed reality installation may be aligned and adjusted on a single device. After the mixed reality content is aligned and/or after any subsequent adjustment is made to a mixed reality space boundary or a view volume property, the system data is transmitted to the network storage. Each mixed reality device may be dynamically updated with mixed reality space and view volume information as the mixed reality experience executes. In some examples, multiple experience installers may adjust or modify procedures from different devices simultaneously in parallel and witness each other's modifications in real-time. This enables developers to design a mixed reality installation in a large, disperse, and complex space, rather than requiring separate installations and adjustments for each of multiple devices to enable multiple users to experience the exhibit simultaneously.

In some examples, machine learning techniques may be advantageously used to optimize designing and adjusting a mixed reality installation. In some examples, a machine learning (ML) platform may be employed to identify and track how long a user gazes at each view volume and how many users are currently touring. This information is used to automatically adjust the design of the mixed reality installation in real-time. For example, the ML platform may dynamically adjust the mixed reality installation so that users may be routed on different paths through the installation if the physical space is too crowded with other users. Also, the ML platform may automatically create, remove, or adjust the size of mixed reality spaces based on current traffic flow. The ML platform may adjust view volumes so that more or less time is associated with certain view volumes. The ML platform may also determine how many spaces, paces, steps, or other movement units exist between mixed reality spaces.

The ML platform may further optimize and automate initial designing of the mixed reality installation by auto-generating initial lay-outs of content based on floorplan and construction of the physical space. Additionally, the ML platform may be used to automatically generate mixed reality spaces and view volumes that align with the physical space. For example, as an installer moves through the physical space with a device, such as an HMD device or other electronic device, the ML platform may auto-generate mixed reality spaces and view volumes that fit the physical space. In some examples, the ML platform may automatically check if designed mixed reality spaces and view volumes properly align with the physical space.

In some examples, machine learning techniques may additionally be used to understand a user's attention and intention. The machine learning platform may be trained with training data, such as user gaze direction, user posture, and motion information so that the machine learning platform may understand and determine when a user is engaging with some content, disengaging with content and intents to change the focus of their attention.

FIG. 1 is a block diagram illustrating a system 100 configured to control application state in a mixed reality installation. The system 100 includes a mixed reality installation 105, at least one user device 116, and a plurality of installer devices 180. The mixed reality installation 105 includes a user detection component 120, a set of parameters 128, a machine learning (ML) platform 160, and network storage 170. The set of parameters 128 may include a set of view volumes 130, a set of mixed reality spaces 140, and a set of content entities 150.

The user detection component 120 includes a user gaze direction detector 122 that detects a user gaze direction 112 of a user and a user position detector 124 that detects the user position 114 of the user 110 based on data received from the user device 116. The user position 114 may include a location and position of the user device 116 within the physical location where the mixed reality installation 105 is installed. The user position detector 124 may detect the user position 114 within the set of mixed reality spaces 140. The set of mixed reality spaces 140 may comprise a plurality of mixed reality spaces, wherein each mixed reality space may be defined by a simple polygon. The physical location may be segmented into a plurality of zones, and each zone may comprise a mixed reality space. The user position detector 124 may detect at which mixed reality space of the plurality of mixed reality spaces the user device 116 is located, based on the user gaze direction 112 and which mixed reality space contains the user position 114.

The user gaze direction detector 122 calculates a ray intersection against a set of view volumes 130, where the ray is constructed from the user gaze direction 112. The ray may be defined by a height where the ray begins and an angle at which the ray is directed away from the user device 116. The set of view volumes 130 includes a plurality of view volumes, which are used to design the mixed reality installation. Each view volume may comprise an invisible volume in any 3D shape, such as a sphere, rectangular prism, or a triangle mesh. The user gaze direction detector 122 determines which view volume the user gaze direction 112 is directed to by checking which view volume the ray constructed from the user gaze direction 112 intersects with.

The mixed reality installation 105 determines an application state 126 based on the detected the user gaze direction 112, the detected user position 114, the determined mixed reality space that contains the user position 114, and the determined view volume the user gaze direction 112 intersects with. In examples where the view volume is associated with or corresponds to the mixed reality space, the application state 126 is enabled and a content entity associated with the view volume is triggered from a set of content entities 150. The view volume may display the content entity associated with the view volume while the user gaze direction 112 intersects with the view volume. In other words, while the user's gaze remains on the content on the view volume, the particular content entity 150 associated with the particular view volume is displayed, or rendered. In examples where the view volume is not associated with or does not correspond to the mixed reality space, the application state 126 is disabled and the content entity 150 associated with the view volume 130 is not triggered.

The user detection component 120 continues to detect and track the user gaze direction 112 and the user position 114. If the user device 116 moves away from the prior mixed reality space, the user detection component 120 may detect a new mixed reality space 140 that contains the changed user position 114. Once the application state 126 is enabled, the content entity 150 is displayed as long as the user gaze direction 112 remains with the view volume, even when the user position 114 changes.

The set of content entities 150 comprise a plurality of content entities. Each content entity may augment one or more of a user's senses with additional sensory stimulus, such as auditory, visual, kinetic, virtual, or other stimulus that is not otherwise present in the physical location.

The user 110 may advantageously use a user device 116 in order to fully experience the mixed reality installation 105. As described herein, the user device 116 may be any type of device that enables the user 110 to experience and/or interact with the set of content entities 150. For example, the user device 116 may be a wearable device such as a head mounted device (HMD), smart glasses, a smart watch, and so forth, or any other electronic device such as a mobile electronic device, a tablet, a laptop computer, and so forth. In some implementations, the user device 116 may be capable of linking virtual content to the physical space. Aspects of the disclosure are operable with any device having an anchor concept that links virtual content to real-world physical space. In some implementations, the user device 116 may share data with other installer devices 180. In some examples, multiple users may use multiple user devices and each user may tailor their experience based on each user's pace and interest.

Designers and installers of the mixed reality installation 105 may employ a set of installer devices 180 to design and install the mixed reality installation 105. In some examples, the devices in the set of installer devices 180 may be similar to the user device 116, which enables the user to experience and/or interact with the set of content entities 150. In other examples, the user device 116 may be an example of devices in the set of installer devices 180 and included within the set of installer devices 180. The set of installer devices may further enable a designer or an installer to create, modify, or adjust the set of view volumes 130 and the set of mixed reality spaces 140. In some examples, the set of installer devices 180 may share data with each other, and with the user device 116.

In some examples, the mixed reality installation 105 may enable an installer to dynamically adjust and/or modify the set of view volumes 130, the set of mixed reality spaces 140, and the set of content entities 150 using the set of installer devices 180 with real-time feedback. In some examples, the set of installer devices 180 may enable the installer to use hand gestures to manually "grab" and move boundaries and points of a mixed reality space in the set of mixed reality spaces and modify the mixed reality space. In some examples, the set of installer devices 180 may enable the installer to intuitively and dynamically change shapes of the view volumes in the set of view volumes 130 with hand gestures. In some examples, creating, adjusting, or modifying the set of view volumes 130 and the set of mixed reality spaces 140 may utilize a user interface 118, such as a low code/no code user interface, that requires no programming/coding or minimal programming/coding. In some examples, the installer may intuitively and dynamically align the set of view volumes 130 and the set of mixed reality spaces 140 with the physical location of the mixed reality installation 105 via the user interface 118.

In some examples, a network storage 170 may be used to share data across devices. The network storage 170 may enable sharing data among the set of installer devices 180, among the set of installer devices 180 and the user device 116, and/or among the user device 116. For example, an installer may use a device from the set of installer devices 180 to modify the set of view volumes 130 and/or the set of mixed reality spaces 140. The modifications are stored in the network storage 170 and readily available to and may be provided to other devices in real-time. Accordingly, the user 110 may simultaneously move through the mixed reality installation and experience the modified mixed reality installation that reflects the modifications made by the installer via the user device 116. Sharing the data through the network storage 170 may enable multiple installers to work in parallel to dynamically modify and/or adjust the mixed reality installation 105. Additionally, whenever any modification and/or adjustment is made to the mixed reality installation 105, the user device 116, or a set of multiple user devices 116 including the installer device(s) 180, may be updated simultaneously in real-time. The combination of sharing data across many devices and dynamic updating of the set of view volumes 130 and the set of mixed reality spaces 140 allows the mixed installation 105 to be installed in a large, complex, and disperse physical space.

In some examples, the ML platform 160 may be advantageously employed to fine-tune the mixed reality installation 105. The training of the ML platform 160 may include machine learning techniques that use, for instance, a trained regressor such as a random decision forest, a directed acyclic graph, a support vector machine, a convolutional neural network, or other neural network, or another trained regressor. In some examples, the training of the machine learning platform 160 may implement training data including the duration of the gaze of a user, which is measured by the direction of the user device 116, at each view volume, a number of users that may fit in each mixed reality space combined with content associated with each view volume, popularity of each content entity measured by a quantity of users that interact with particular content entity and a duration of the interaction(s), and a duration of tour for each user when applying machine learning techniques and/or algorithms. Additionally or alternatively, in some examples, the training of the machine learning platform 160 may implement training data from the user device 116 that includes user gaze direction, user posture, and motion information in order for the machine learning platform 160 to understand and determine when a user 110 is engaging with some content, disengaging with content, and/or intends to change the focus of their attention. A synthetic data set including thousands or millions of training data pairs may be stored in a machine learning data structure, such as in the network storage 170, for use in training the machine learning platform 160 and/or other trained models as described herein.

In some examples, the trained machine learning platform 160 may optimize the mixed reality installation by automatically adjusting the set of view volumes 130, the set of mixed reality spaces 140, and the set of content entities 150 in real-time. For example, based on results provided by the machine learning platform 160, the user device 116 may present a different path to the user 110 if the physical space is too crowded. In some examples, the machine learning platform 160 may adjust the content entity 150 for the set of view volumes 130 based on popularity, number of users in the physical space, and/or duration of user's gaze. In some examples, the machine learning platform 160 may broaden or enlarge one or more mixed reality spaces 140 based on a lesser number of users in the physical space, or narrow or shrink one or more mixed reality spaces 140 based on a greater number of users in the physical space.

FIGS. 2A-2D are diagrams illustrating a mixed reality installation where a content entity is activated for a user based on the user's gaze direction and the user's position. The diagrams shown in FIGS. 2A-2D are presented for illustration only and should not be construed as limiting. Various examples of mixed reality installations may be used without departing from the scope of the present disclosure.

Each of FIGS. 2A-2D illustrates first, second, and third mixed reality spaces 140 and first, second, and third view volumes 130.

Figure 2A:
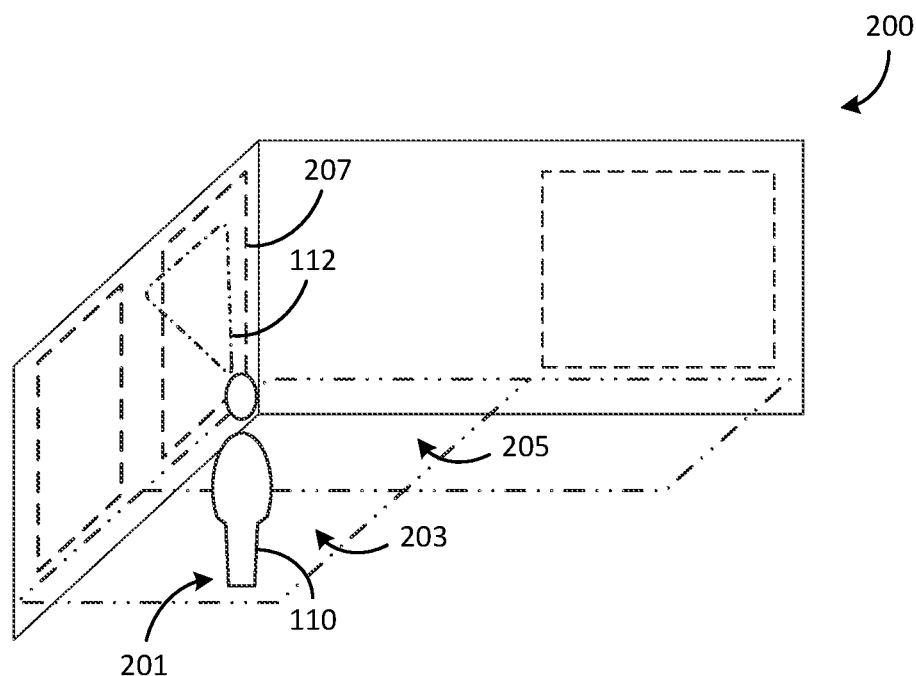
FIGS. 2A-2D are diagrams illustrating a user in a mixed reality installation.

FIG. 2A illustrates a first diagram 200 that illustrates a user, such as the user 110, at a first user position 201 using a user device 116 in a first mixed reality space 203 while gazing at a second view volume 207 corresponding to the next mixed reality space, i.e., the second mixed reality space 205, that is adjacent to the first mixed reality space 203 that the user 110 is currently located in. The first user position 201 may be an example of the user position 114, the first mixed reality space 203 may be an example of the first mixed reality space 140, the second view volume 207 may be an example of the second view volume 130, and the second mixed reality space 205 may be an example of the first mixed reality space 140. Until the user moves to the second mixed reality space 205 that corresponds to the second view volume 207 that the user 110 is gazing at, content for the second mixed reality space 205 is not activated. In some examples, content for the current mixed reality space 203 continues to be presented while the user 110 is in the first user position 201 corresponding to the current content. In other examples, content for the current mixed reality space 203 is deactivated and no longer presented while the user 110 in in the first user position 201 corresponding to the current content but the user gaze direction 112 is focused on the second view volume 207 for the next mixed reality space 205.

Figure 2B:
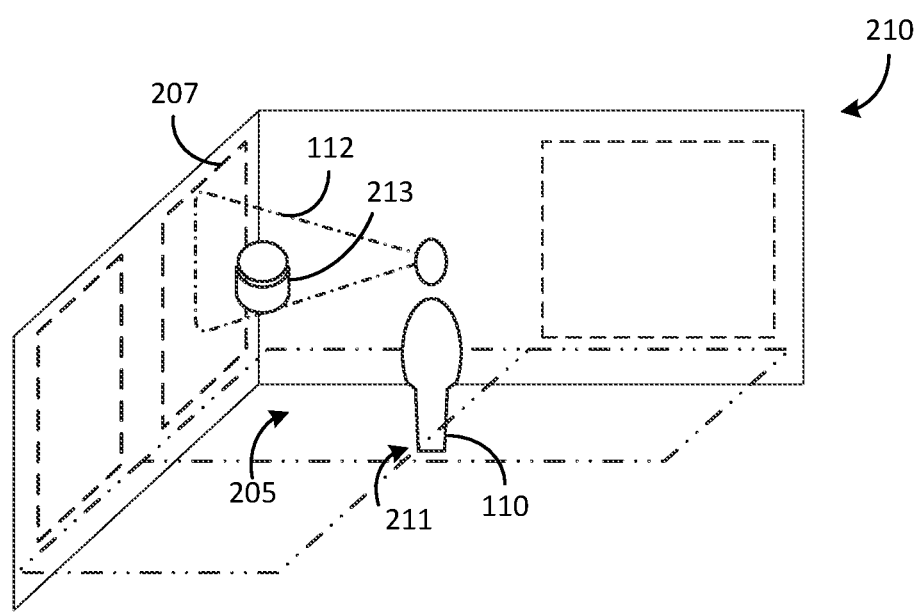

FIG. 2B illustrates a second diagram 210 that illustrates the user 110 having progressed to anew, or updated, user position 211 that corresponds to the second mixed reality space 205 and gazing in a user gaze direction 112 that corresponds to the second view volume 207 that is associated with the second mixed reality space 205 that the user position 211 is currently in following the update to the user position. As shown in FIG. 2B, content 213 for the current second mixed reality space 205 is activated and the user may interact with the content 213.

Figure 2C:
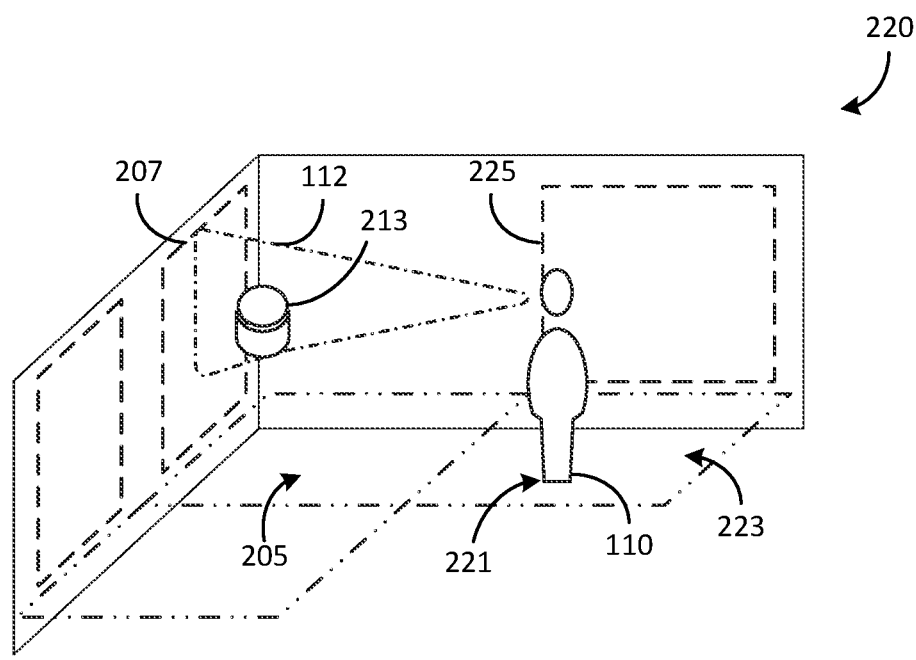

FIG. 2C illustrates a third diagram 220 that illustrates the user 110 in a third user position 221, where the user 110 is moving away from the second mixed reality space 205 while maintaining a user gaze direction 112 toward the second view volume 207. In particular, the third user position 221 depicts the user 110 in a third mixed reality space 223 associated with a third view volume 225. The In this example, the content 213 for the second mixed reality space 205 remains active while the user gaze direction 112 intersects the second view volume 207.

Figure 2D:
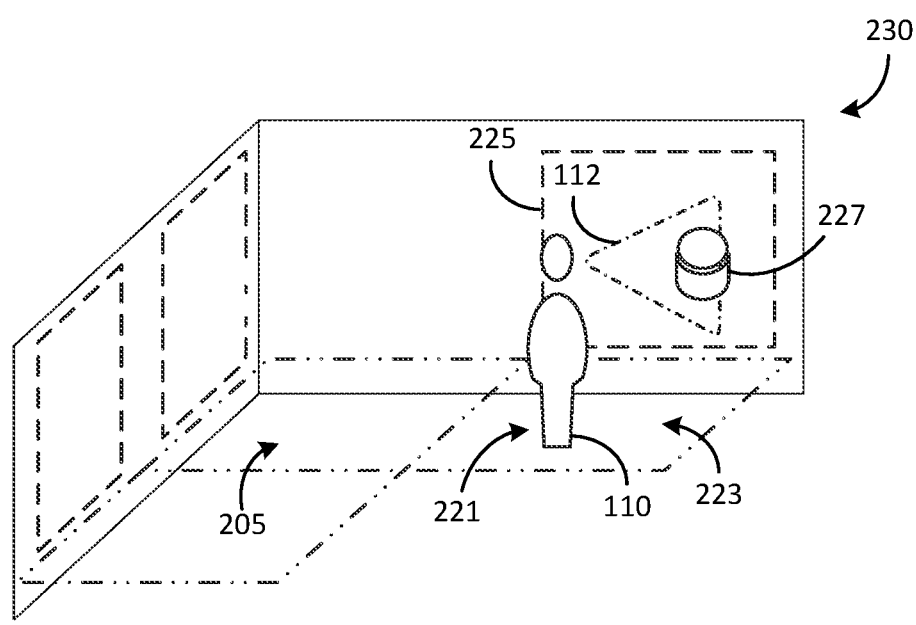

FIG. 2D illustrates a fourth diagram 230 that illustrates the user 110 in the third user position 221, but with an updated user gaze direction 112 from the gaze direction illustrated in FIG. 2C such that the user 110 is now looking at a new view volume, the third view volume 225, which corresponds to the third mixed reality space 223 that the user position 114 indicates the user 110 is currently located in. The new, third view volume 225 is activated, presenting new content 227, and the prior second view volume 207 is disabled.

FIGS. 3A-3D are diagrams illustrating adjusting boundaries for a mixed reality. The diagrams illustrated in FIGS. 3A-3D are presented for illustration only and should not be construed as limiting. Various examples of adjusting boundaries for a mixed reality may be implemented without departing from the scope of the present disclosure.

Figure 3A:
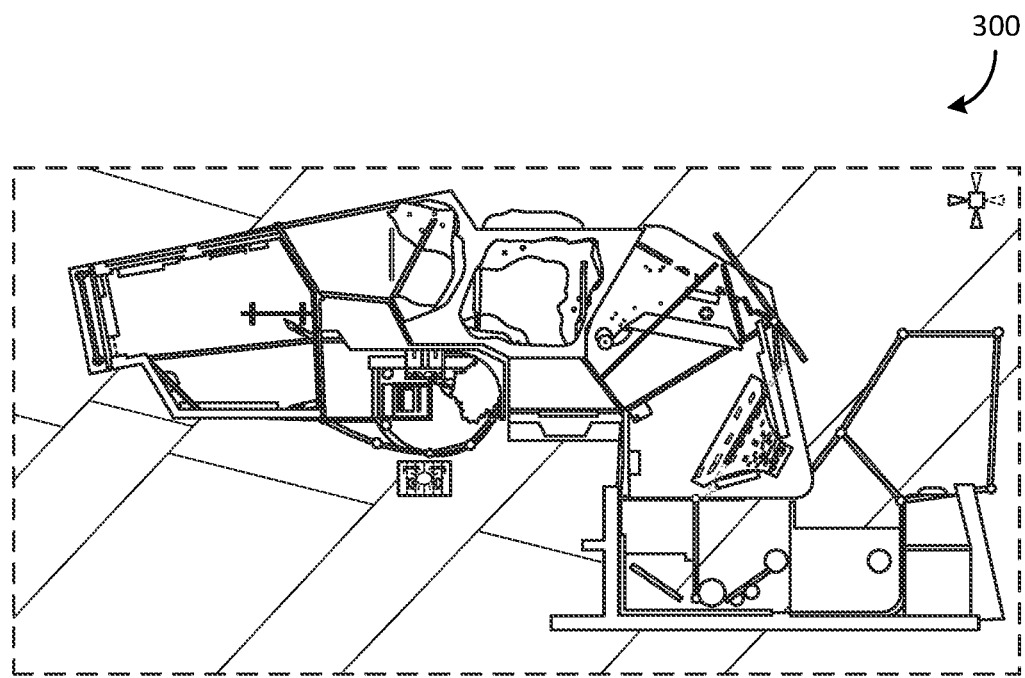
FIGS. 3A-3D are diagrams illustrating adjusting boundaries for a mixed reality.

FIG. 3A illustrates a default layout 300 of a physical space. In some examples, the physical space may be at least part of the interior a defined physical space including, but not limited to, a school, a museum, an office building, and so forth. In other examples, the physical space may include, but is not limited to, an outdoor space, such as a street, an outdoor shopping area, and so forth. In other examples, the physical space may include a combination of indoor and outdoor spaces. The physical space includes a plurality of boundaries which defined one or more mixed reality spaces. The mixed reality spaces may correspond to different areas where different virtual content, such as the content in the set of content entities 150, may be presented to a user 110 via a user device 116.

Figure 3B:
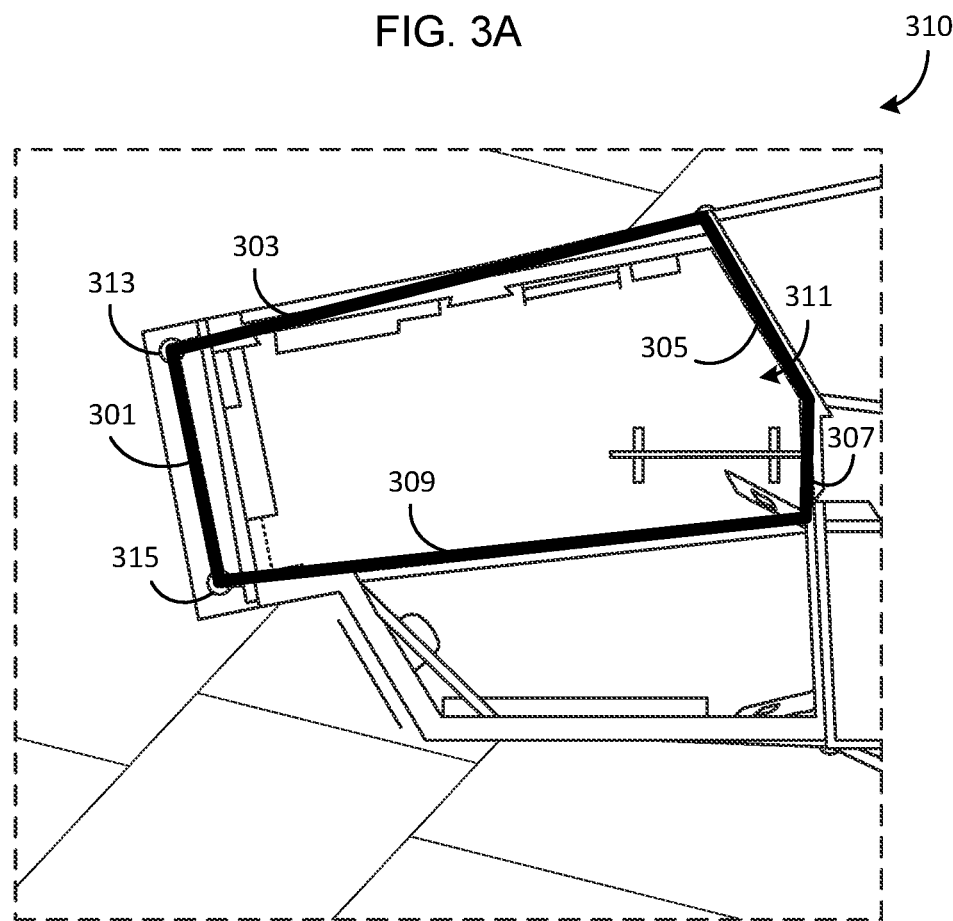

FIG. 3B illustrates a mixed reality space 310 overlaid on a physical space 311 and defined by a plurality of boundaries 301, 303, 305, 307, 309. The boundaries 301, 303, 305, 307, 309 that define the mixed reality space 310 resemble, but do not exactly match, the boundaries of the physical space 311. Thus, the boundaries 301, 303, 305, 307, 309 that define the mixed reality space 310 should be adjusted, or modified, to more closely match the boundaries of the physical space 311. The boundaries 301, 303, 305, 307, 309 form a polygon defined by a plurality of space points that define the mixed reality space 310. For example, a boundary includes multiple lines that collectively form a polygon. Each line is defined by two space points 313, 315. In some examples, a space point is used in more than one line. For example, the space point 313 is used to define both the boundary line 301 and the boundary line 303.

In some examples, the plurality of boundaries that define the mixed reality space may be adjusted using hand gestures that are detected via the user device 116. For example, while wearing or otherwise implementing the user device 116, the user 110 may navigate to a developer menu of the user device 116 and update an application mode, or AppMode, to a mode that enables the editing of spaces, such as EditSpaces. In some examples, authentication may be required to access one or both of the developer menu and the edit spaces menu in order to ensure that the spaces are edited only by one who is authorized to do so. For example, the user device 116 may require a passcode, personal identification number (PIN), biometric data, or other means of authentication prior to authorizing access to one or both of the developer menu or the edit spaces menu. While the user device 116 is in the edit spaces mode, hand gestures such as a drag and drop or a far interaction may be implemented to move one or more of the space points. For example, a hand gesture may be used to move the space point 313 to align with the respective corner of the physical space, which automatically adjusts the boundary lines 301, 303 based on the movement of the space point 313. In another example, a far interaction may be used to move the space point 313, such as by highlighting a user interface element using a gaze input detected by the user device 116. Following the adjustment, the user device 116 exits the edit spaces menu and the developer menu, triggering the updates to the boundary or boundaries to be stored and automatically transmitted to the other connected installer devices 180.

In some implementations, space points may be added or removed while the user device 116 is in edit mode. For example, a space point may be added to add a new boundary line, added to change a boundary line, removed to remove a boundary line, and so forth.

Figure 3C:
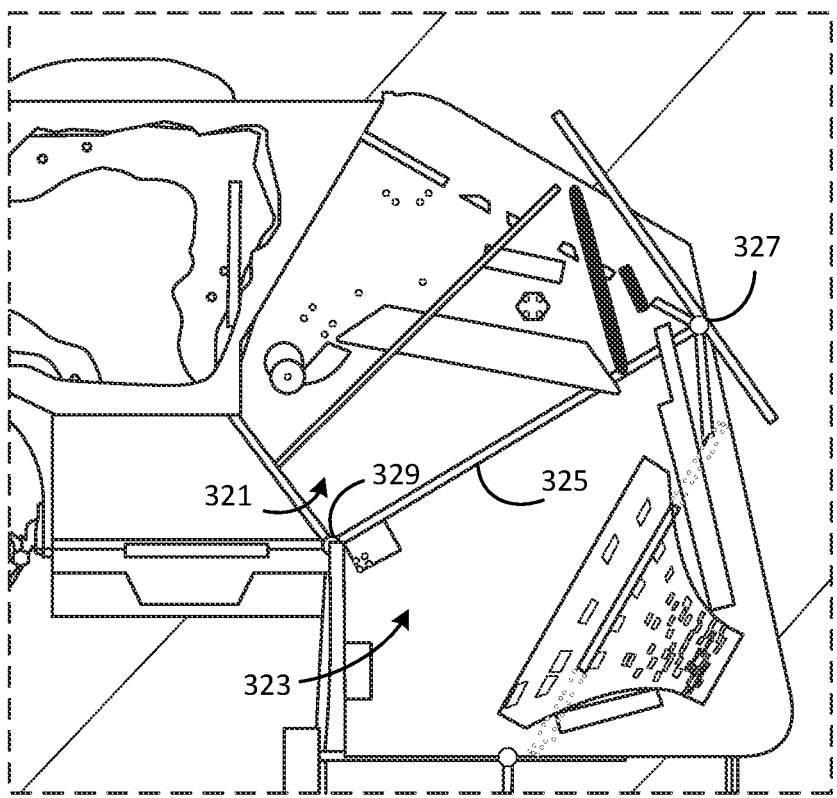

In some implementations, a room may contain more than one mixed reality space. For example, as illustrated in FIG. 3C, the physical space includes two mixed reality spaces 321, 323 separated by a first boundary line 325 defined by a first space point 327 and a second space point 329 that crosses the room of the physical space. It should be understood that each of the first space point 327 and the second space point 329 are used to define the boundary of at least three boundary lines. Therefore, the adjustment of either the first space point 327 or the second space point 329 adjusts not only the first boundary line 325 but also each boundary line which the respective space point is used to define.

Figure 3D:
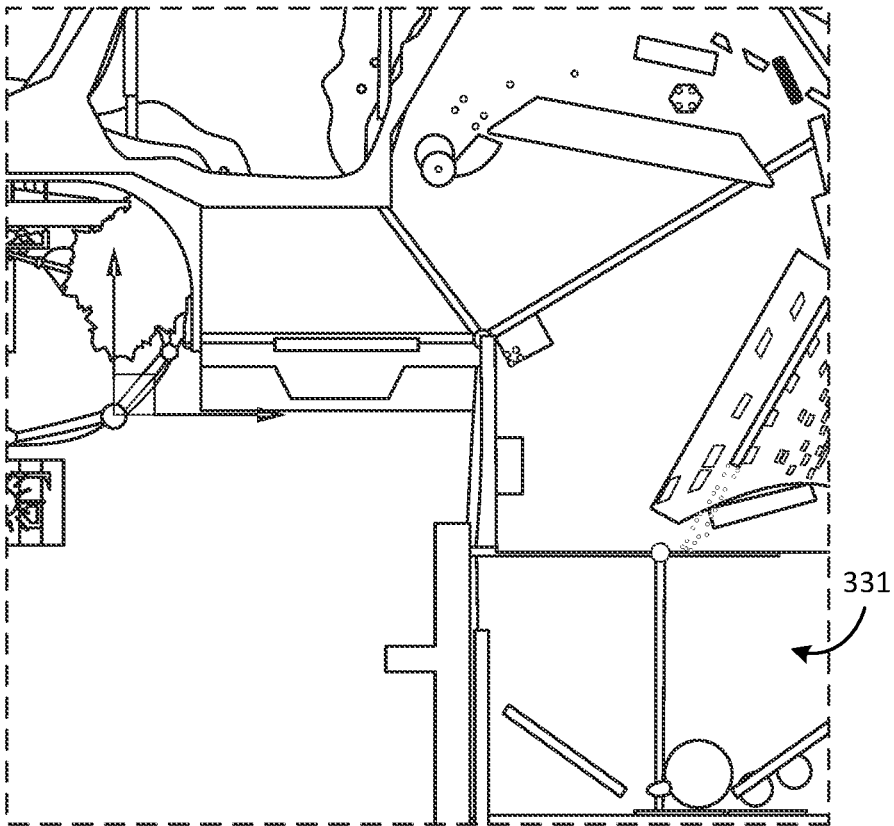

FIG. 3D illustrates an area of the physical space that includes both indoor physical space and outdoor space. FIG. 3D further includes a defined final space 331 which represents the end, or conclusion, of a mixed reality experience. When the user device 116 reaches the final space 331, the user device 116 may render specific content with instructions to return the user device 116 to a designated area. For example, the instructions may include text that includes instructions on where to return the user device 116, navigation instructions such as one or more arrows that instruct where the return the user device 116, and so forth.

Figure 4A:
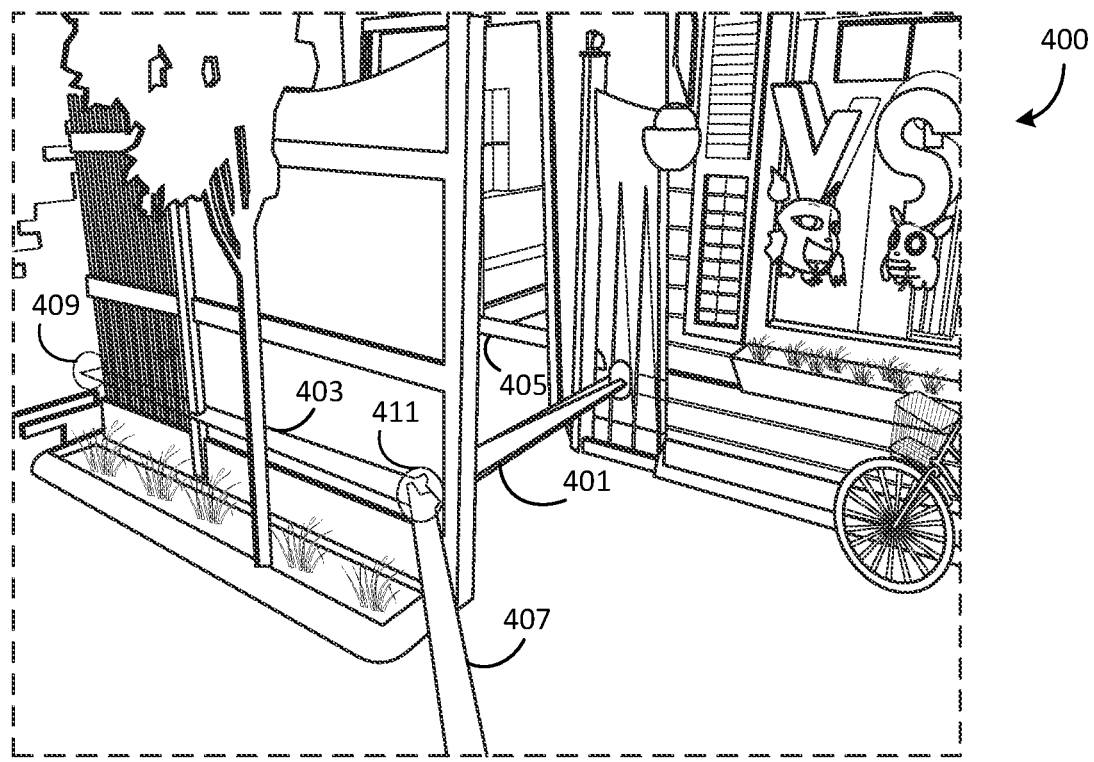
FIGS. 4A and 4B are diagrams illustrating space boundaries.
Figure 4B:
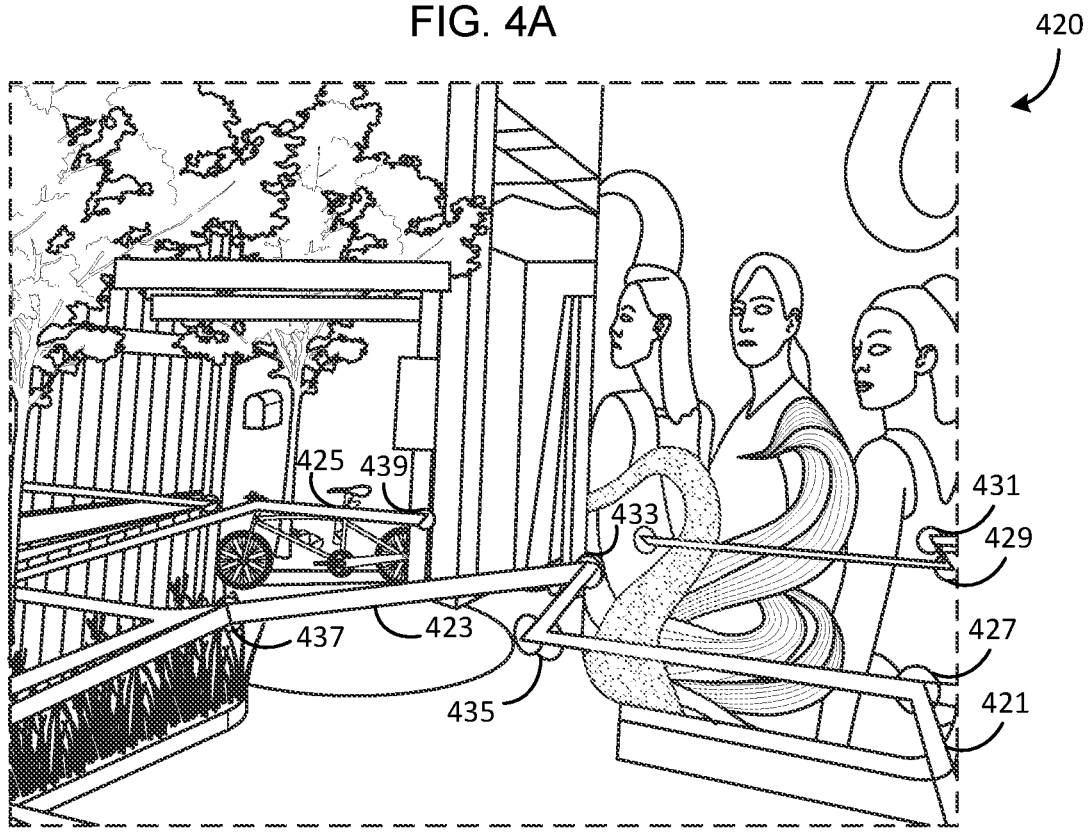

FIG. 4A-4B are example diagrams illustrating boundaries of a mixed reality space. The example diagrams illustrated in FIGS. 4A-4B are for illustration only and should not be construed as limiting. Various examples of boundaries of a mixed reality space may be implemented without departing from the scope of the present disclosure.

FIG. 4A is an example diagram illustrating boundaries of a mixed reality space 400 as designed by a designer. As described herein, a mixed reality space may be defined by a plurality of space points that define boundary lines that collectively create a polygon in any shape, so that the polygon may be fit to any space in the real-world physical location. In some implementations, a floorplan or blueprint may be utilized to design mixed reality spaces and fill the mixed reality spaces with 3D content as described herein. The mixed reality space 400 illustrated in FIG. 4A includes boundary lines 401, 403, 405, 407 and space points 409 and 411.

FIG. 4B is an example diagram illustrating boundaries of a mixed reality space 420 as installed. For example, the example diagram illustrated in FIG. 4B may be an example of a mixed reality space after the mixed reality space has been adjusted, or modified, as described herein. In examples where the actual construction of the real-world physical location differs from the original floorplan or blueprint, a mixed reality space may be easily adjusted to be aligned with the physical location by adjusting and modifying boundaries of the mixed reality space. The mixed reality space 420 illustrated in FIG. 4B includes at least the boundary lines 421, 423, 425 and space points 427, 429, 431, 433, 435, 437, 439.

Figure 5:
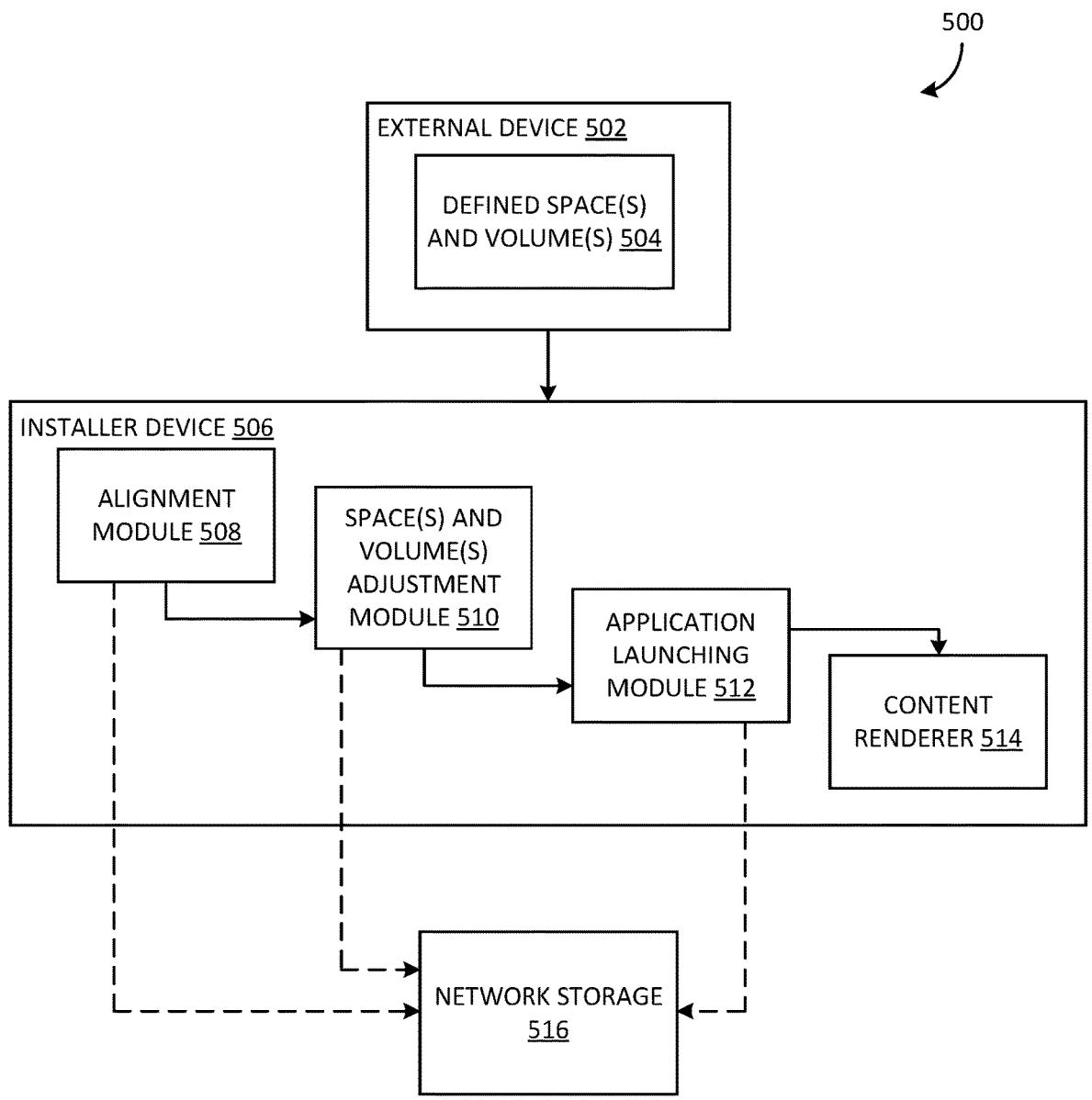
FIG. 5 is a diagram illustrating controlling application state in a mixed reality installation.

FIG. 5 is a block diagram illustrating an example process flow and data flow of operation of a mixed reality installation. The example block diagram illustrated in FIG. 5 is for illustration only and should not be construed as limiting. Various examples of a mixed reality installation may be implemented without departing from the scope of the present disclosure.

The block diagram 500 includes an external device 502, one or more installer devices 506, and network storage 516. Although FIG. 5 illustrates a single installer device 506 for ease of illustration, multiple installer devices 506 may install the mixed reality space or spaces defined by the set of mixed reality spaces and view volumes 504 simultaneously. The external device 502 defines and stores a set of mixed reality spaces and view volumes 504, which collectively define how mixed reality content is triggered. In some examples, the external device 502 defines the set of mixed reality spaces and view volumes 504 off-site from the physical location where the mixed reality installation will take place.

For example, defining the set of mixed reality spaces and view volumes 504 may be performed entirely off-site, partly off-site and partly on-site, or entirely on-site. Application and initial spatial data comprising the set of mixed reality spaces and view volumes may be transferred to all mixed reality devices, e.g., each installer device 506.

In some implementations, the installer device 506 is an example of the one or more installer devices 180 illustrated in FIG. 1. The installer device 506 may include an alignment module 508, a space and volume adjustment module 510, an application launching module 512, and a content renderer 514. For example, each of the alignment module 508, the space and volume adjustment module 510, the application launching module 512, and the content renderer 514 may be a specialized processor implemented on a processor of the installer device 506, such as the processor 919, that executes a specialized function of the installer device 506.

At the installation location, the alignment module 508 may perform an initial alignment in the physical installation location. The initial alignment may create, or retrieve, spatial data that is sent to the network storage 516. After the initial alignment, the space(s) and volume(s) adjustment module 510 may make fine adjustments to the set of mixed reality spaces and view volumes 504, so they may more closely adhere to the physical location as built. For example, as illustrated in FIGS. 3A-3D, various space points may be adjusted to adjust various boundary lines in order for the boundaries of the mixed reality spaces and view volumes 504 to more closely match the physical boundaries of the physical location. The modified spatial data is also transmitted to the network storage 516. Upon a mixed reality participant entering the mixed reality installation location using the installer device 506, the application launching module 512 launches the mixed reality application. By launching the mixed reality application, the application retrieves the modified spatial data from the network storage 516 so that the modified spatial data is available to the user devices 116 presently being utilized by the participants. The content renderer 514 uses the spatial data and the user's position and orientation to trigger specific mixed reality content at the appropriate time based at least in part on the user position 114 and user gaze direction 112 as described herein.

Figure 6A:
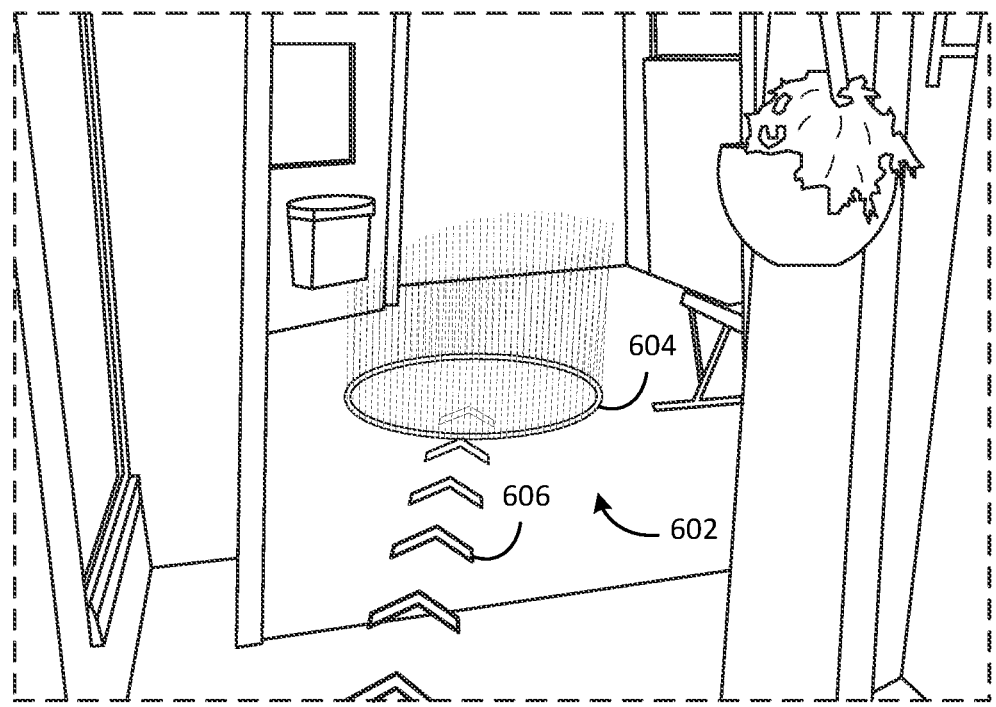
FIGS. 6A-6B are diagrams illustrating navigation nodes in a mixed reality.
Figure 6B:
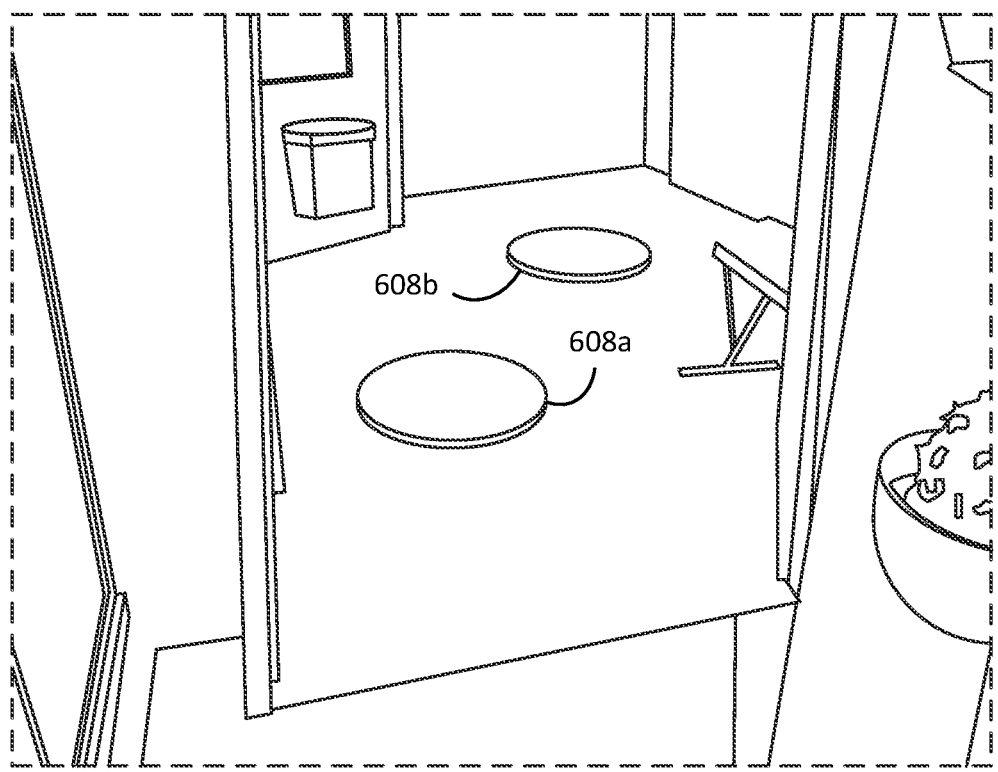

FIGS. 6A-6B are diagrams illustrating navigation nodes in a mixed reality installation. The navigation nodes presented in FIGS. 6A-6B are for illustration only and should not be construed as limiting. Various examples of navigation nodes may be implemented without departing from the scope of the present disclosure.

As referenced herein, a navigation node is a navigation point in a mixed reality installation, as described herein, that directs, or guides, a user to a next area of content. For example, following the application launching module 512 launching the application, one or more navigation nodes 602 may be presented, or rendered, by the content renderer 514 as part of the rendered content. The navigation node 602 may include a position node 604 and a directional node 606. The position node 604 indicates a position for the user device 116 to be located to view the next content. The position may be one of the first mixed reality space 203, second mixed reality space 205, and third mixed reality space 223 illustrated in FIGS. 2A-2D that enables the user to view content related to a particular view volume 130. The directional node 606 presents a virtual pathway from the current user position 114 to the position node 604. The directional node 606 may be dynamic and automatically adjust to direct the user 110 to the position node 604 as the user 110 moves about the mixed reality installation.

In some implementations, the navigation node 602 may be automatically enabled upon the mixed reality installation being launched. For example, in examples where the mixed reality installation presents a progression through an exhibit, launching the mixed reality installation may include automatically launching navigation nodes 602 so the user may follow the progression as closely as possible. In these implementations, a first navigation node 602 may be presented upon the launching of the mixed reality installation and then, upon the first navigation node 602 being reached, the content renderer 514 may cease to present the first navigation node 602 and instead render a second navigation node 602 that directs the user to the next mixed reality space 140 of the mixed reality installation. Thus, the navigation nodes help to navigate, or guide, a user through the mixed reality installation.

In other implementations, the navigation node 602 may be enabled or disabled manually. For example, some mixed reality installations may be designed such that a user may progress through the mixed reality installation in any order and at any pace. Navigation nodes 602 may be enabled in order to present an optimal path through the mixed reality installation, but also may be disabled in order for a user 110 to progress through the mixed reality installation in any order and at any pace.

In other implementations, some navigation nodes 602 may be configured to be enabled or disabled manually, while other navigation nodes 602 within the same mixed reality installation may be automatically enabled and not available for disabling. For example, a mixed reality installation may allow a user 110 to disable navigation nodes 602 that navigate through the mixed reality installation, but do not allow a user 110 to disable navigation nodes 602 that navigate the user 110 to the beginning of the mixed reality installation or to a drop off location for the user device 116 at the conclusion of the mixed reality installation. In this example, the navigation nodes 602 are present from the time the user 110 turns on the user device 116 to launch the mixed reality installation and navigate to the first view volume 130 of the mixed reality installation, may be disabled as the user 110 progresses through the mixed reality installation, and then are automatically re-enabled once the user device 116 is detected at a particular user position 114 that indicates the user 110 has completed the mixed reality installation and should then return the user device 116 to a drop-off location.

Each navigation node 602 may have a default placement that may be further adjusted by the installer of the mixed reality installation. FIG. 6B illustrates an edit mode for a navigation point according to various examples of the present disclosure. To adjust, or edit or modify, the default placement of a navigation node 602, the user 110 may navigate to a developer menu of the user device 116 and update an application mode, or AppMode, to a mode that enables the editing of navigation nodes, such as EditNavigation. As described herein, in some examples, authentication may be required to access one or both of the developer menu and the edit navigation menu in order to ensure that the navigation nodes are edited only by one who is authorized to do so. For example, the user device 116 may require a passcode, personal identification number (PIN), biometric data, or other means of authentication prior to authorizing access to one or both of the developer menu or the edit navigation menu. While the user device 116 is in the edit navigation mode, hand gestures such as a drag and drop or a far interaction may be implemented to move one or more of the navigation points 608. As shown in FIG. 6B, the navigation points 608 represent the position node 604 illustrated in FIG. 6A. It should be understood that the directional node 606 may not be manually adjusted, as the directional node 606 is presented dependent on where the user device 116 is presently located in order to provide navigation from the current user position 114 to the next navigation node 602. Thus, the directional node 606 is dynamic and may not require adjusting from the edit navigation menu.

In some implementations, one or more navigation nodes 602 are automatically and dynamically adjusted based on data received from the ML platform 160. For example, as described herein, the ML platform 160 may receive training data that includes, but is not limited to, a number of users that may fit in each mixed reality space combined with content associated with each view volume, popularity of each content entity measured by a quantity of users that interact with particular content entity and a duration of the interaction(s), and a duration of tour for each user. By training the ML platform 160 using this data, the ML platform 160 may determine that an optimal location for a particular navigation node 602 is different than its present location. For example, when a particular mixed reality space 140 is unusually crowded, i.e., a high number of users are in the area, the content renderer 514 may automatically adjust the navigation node 602 for the mixed reality space 140, based on feedback received from the ML platform 160, to be nearer the corresponding view volume 130 for the mixed reality space 140 in order for the user 110 in the mixed reality installation to be able to better view the view volume 130. In contrast, when a low number of users are in a particular mixed reality space 140, the content renderer 514 may automatically adjust the navigation node 602 for the mixed reality space 140, based on feedback received from the ML platform 160, to be further away from the corresponding view volume 130 for the mixed reality space 140.

In another example, the navigation nodes 602 may be dispersed throughout a mixed reality space 140 for different user devices 116 in order to avoid congestion in any one particular area. For example, the respective navigation nodes 602 for a particular mixed reality space 140 may be dispersed throughout the mixed reality space 140. In other words, a first user device 116 may present a navigation node 602 in a first area of the mixed reality space 140, a second user device 116 may present a navigation node 602 in a second area of the mixed reality space 140, and so forth. Although the content renderer 514 may present the corresponding view volume 130 based on any number of the user positions 114 corresponding to the navigation nodes 602, and dependent on the user gaze direction 112, the navigation nodes 602 may be dispersed throughout the mixed reality space 140, based on feedback received from the ML platform 160, to facilitate an improved user experience.

In some implementations, each successive navigation node 602 may be placed within a line of sight from the previous navigation node 602. For example, as shown in FIG. 6B, the second navigation point 608*b* is within sight of the first navigation point 608*a* when the user gaze direction 112 of the user device 116, from the first navigation point 608*a*, is toward the second navigation point 608*b*.

Figure 7:
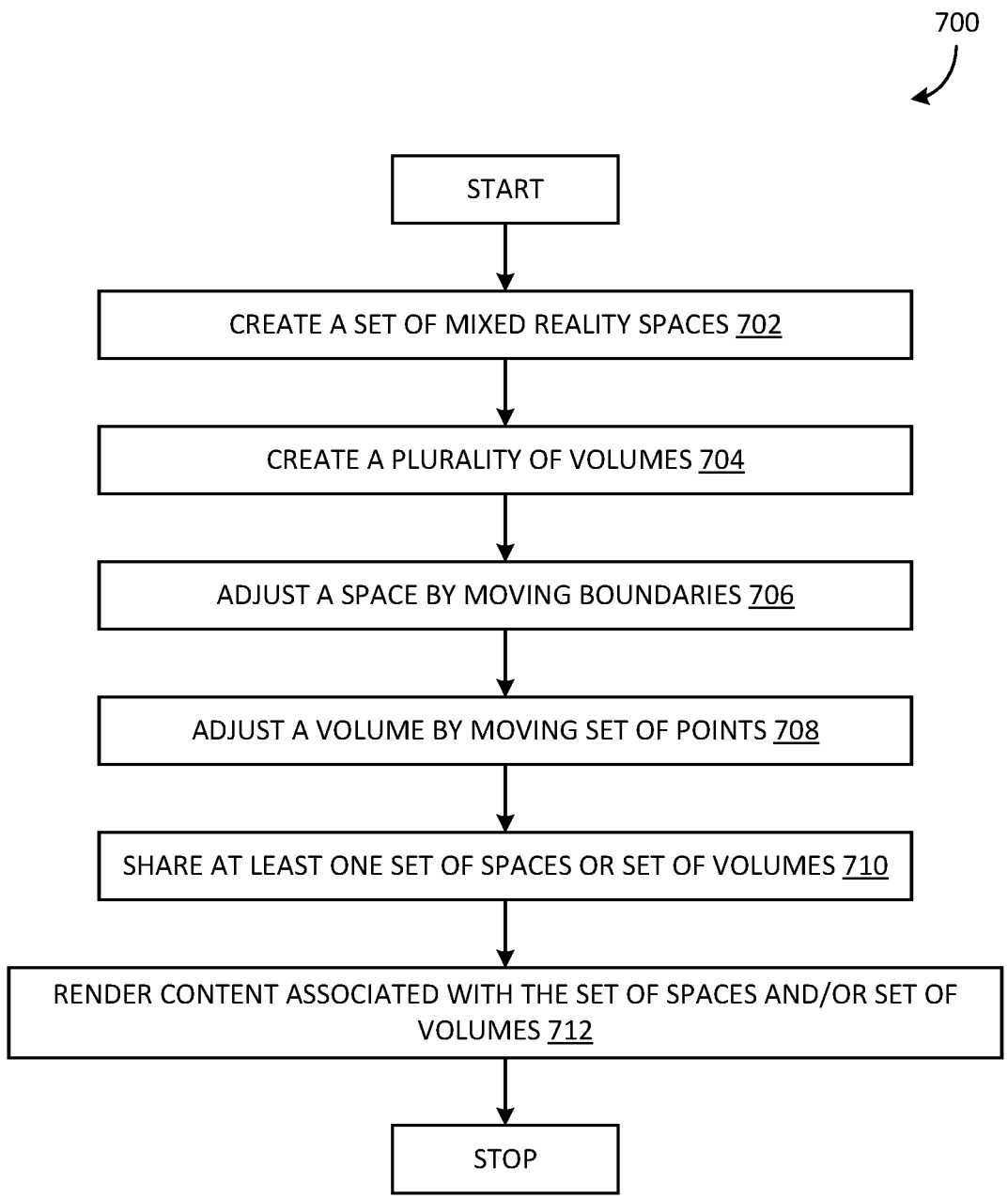
FIG. 7 is a flow chart illustrating a computerized method of creating a set of mixed reality spaces and a plurality of volumes.

FIG. 7 is a flow chart illustrating a computerized method of creating a set of mixed reality spaces and a plurality of volumes according to various implementations of the present disclosure. The computerized method 700 illustrated in FIG. 7 is for illustration only. Other examples of the computerized method 700 may be used without departing from the scope of the present disclosure. The computerized method 700 may be implemented by one or more components of the system 100 illustrated in FIG. 1, such as the components of the computing apparatus 918 described in greater detail below in the description of FIG. 9. In particular, the steps of the computerized method 700 can be executed by the processor 919 of the computing apparatus 918, where the computing apparatus 918 is an example of a user device 116 and/or one of the installer devices 180.

The computerized method 700 begins by the user device 116 creating a set of mixed reality spaces 140 in operation 702. Each mixed reality space 140 may be a polygon comprising a set of boundaries that intersect at a set of points. In operation 704, the user device 116 creates a plurality of volumes, such as the view volumes 130. Each view volume 130 is a three-dimensional (3D) shape that comprises a set of points. Each view volume 130 further corresponds to a content entity, such as a content entity of the set of content entities 150.

In operation 706, the user device 116 adjusts one of the created mixed reality spaces 140 by moving at least one of the set of boundaries using the user interface 118. For example, the set of boundaries may be moved by adjusting the boundary line or one or more of the points that create the boundary line. In operation 708, the user device 116 adjusts one of the created view volumes 130 by moving at least one of the set of points using the user interface 118.

In some implementations, one or both of the mixed reality spaces 140 and view volumes 130 may be adjusted manually. For example, an input may be received via the user interface 118 to manually adjust one or more of the set of points or boundary lines. In other implementations, one or both of the mixed reality spaces 140 and view volumes 130 may be adjusted automatically, for example based on feedback received from the ML platform 160.

In operation 710, the user device 116 shares at least one of the set of mixed reality spaces 140 or the set of view volumes 130 to another device, such as one or more of the installer devices 180. Once the set of mixed reality spaces 140 and view volumes 130 have been shared among the installer devices 180, any of the installer devices 180 and/or the user device 116 may be utilized to render content, such as a content of the set of content entities 150, that are associated with at least one of the set of mixed reality spaces 140 or the set of view volumes 130 upon detecting a user gaze direction 112 and a user position 114 of a user via the respective user device 116 in operation 712.

Although presented herein as a sequence of steps, it should be understood that various examples are possible. Various operations may be added, omitted, and/or performed out of order without departing from the scope of the present disclosure. For example, the plurality of view volumes 130 may be created prior to, concurrently with, or following the creation of the set of mixed reality spaces 140. The view volumes 130 may further be adjusted prior to, concurrently with, or following the adjustment of the set of mixed reality spaces 140.

Figure 8:
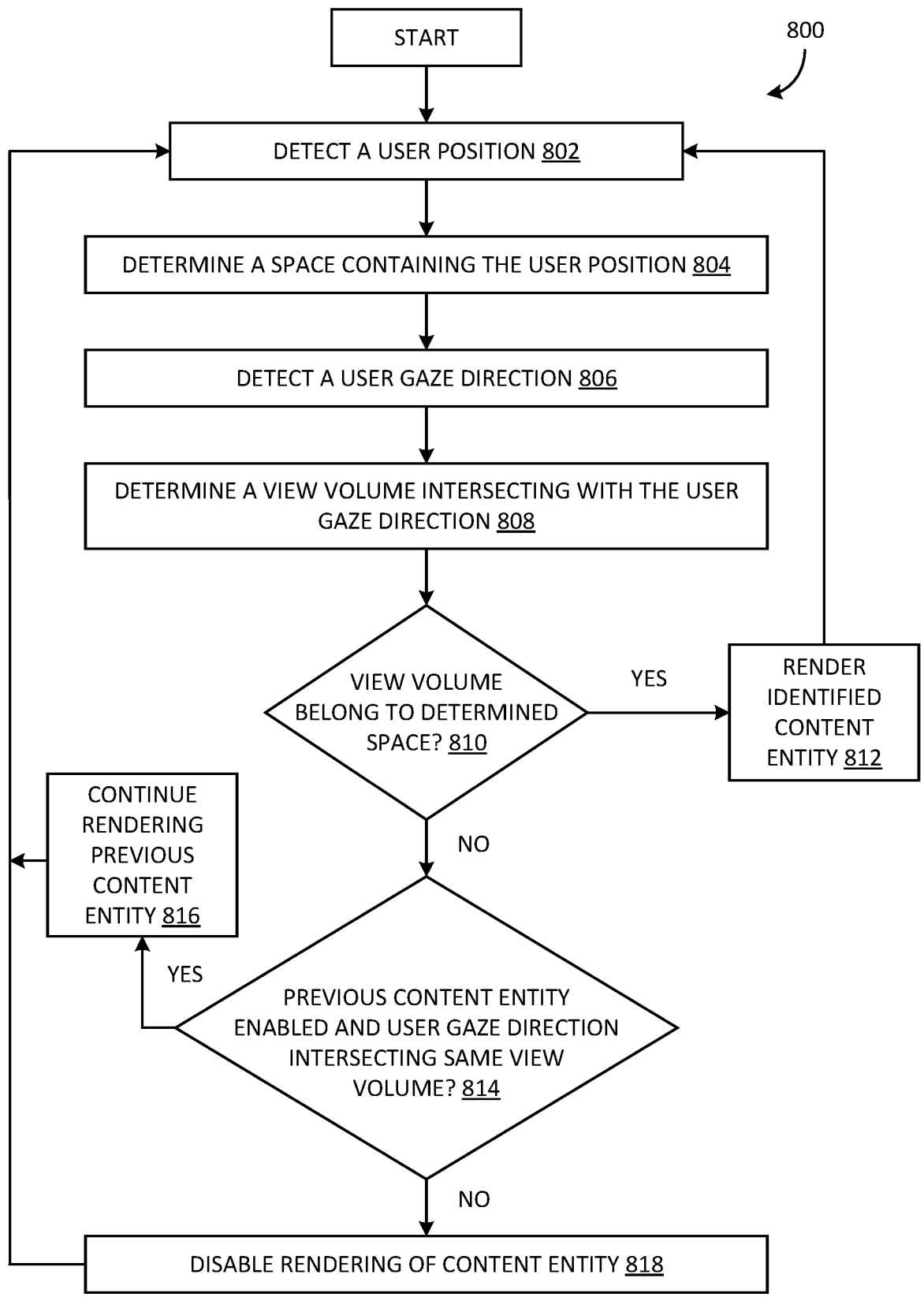
FIG. 8 is a flow chart illustrating a computerized method of enabling an application state.

FIG. 8 is a flow chart illustrating a computerized method of enabling an application state according to various implementations of the present disclosure. The computerized method 800 illustrated in FIG. 8 is for illustration only. Other examples of the computerized method 800 may be used without departing from the scope of the present disclosure. The computerized method 800 may be implemented by one or more components of the system 100 illustrated in FIG. 1, such as the components of the computing apparatus 918 described in greater detail below in the description of FIG. 9. In particular, the steps of the computerized method 800 can be executed by the processor 919 of the computing apparatus 918, where the computing apparatus 918 is an example of a user device 116 and/or one of the installer devices 180.

The computerized method 800 begins by the user device 116 detecting a first user position 114 of a user in operation 802. The first user position 114 signifies a physical location of the user device 116. In operation 804, the user device 116 determines a first mixed reality space 140 in which the first user position 114 is contained based on the detected first user position 114. For example, the user device 116 may cross-reference the detected first user position 114 with a mapping of the location to determine the first mixed reality space 140 from a set of mixed reality spaces, such as those created in operation 702 and/or adjusted in operation 706.

In operation 806, the user device 116 detects a first user gaze direction 112 of the user 110 of the user device 116. In some examples, a ray may be constructed from the first user gaze direction 112 that is defined by a height where the ray begins and an angle at which the ray is directed away from the user device 116. In operation 808, the user device 116 determines a first view volume 130, from a set of view volumes 130, that intersects with the first user gaze direction 112. For example, the user device 116 may determine which view volume 130 intersects with the first user gaze direction 112.

In operation 810, the user device 116 determines whether the determined view volume 130 belongs to the determined mixed reality space 140. In other words, the user device 116 determines whether the particular view volume 130 at which the user's gaze is directed corresponds to the determined mixed reality space 140 where the user device 116 is physically located. Where the determined view volume 130 is determined to belong to the determined mixed reality space 140, the user device 116 identifies a content entity 150 associated with the determined view volume 130 and renders the identified content entity 150 via the user interface 118 in operation 812. Following and/or during the rendering of the identified content entity 150, the user device 116 continues to monitor the position of the user device 116 and, when a new user position 114 is detected, returns to operation 802.

Where the determined view volume 130 is not determined to belong to the determined mixed reality space 140, the user device 116 determines whether a previous content entity 150 is enabled and whether the first user gaze direction 112 intersects the same view volume 130 in operation 814. In other words, the first user gaze direction 112 may be focused toward a same view volume 130 that presented previous content, while the user position 114 has changed. For example, a user may have changed their physical location to a new mixed reality space 140 while their gaze is still focused on an earlier iteration of content. Where the previous content entity 150 is enabled and the first user gaze direction 112 intersects the same view volume 130, the user device 116 continues to render the previous content entity in operation 816. Following and/or during the rendering of the previous content entity 150, the user device 116 continues to monitor the position of the user device 116 and, when a new user position 114 is detected, returns to operation 802.

Where either the previous content entity 150 is not enabled or the first user gaze direction 112 does not intersect the same view volume 130, the user device 116 disables the rendering of the previous content entity in operation 818. Following the disabling of rendering of the previous content entity 150, the user device 116 continues to monitor the position of the user device 116 and, when a new user position 114 is detected, returns to operation 802.

In some examples, the user device 116 may detect an updated user gaze direction 112. Based on the updated user gaze direction 112, the user device 116 determined an updated view volume 130 from the set of view volumes based on the view volume 130 the updated user gaze direction 112 intersects with. Based on the determination of the updated view volume 130, various examples are possible. Based on determining the updated view volume 130 is same as the first view volume 130, the user device 116 continues to render the content entity 150 on the first view volume 130. Based on determining the updated view volume 130 is different from the first view volume 130 and the updated view volume 130 does not belong to the first mixed reality space 140, the user device 116 disables the content entity 150 corresponding to the first view volume 130. Based on determining the updated view volume 130 is different from the first view volume 130 and the updated view volume 130 belongs to a second mixed reality space 140, enabling an updated content entity 150 corresponding to the updated view volume 130.

In some examples, the computerized method 800 further includes training the machine learning platform 160 using training data and adjusting at least one of the set of mixed reality spaces 140 or the set of view volumes 130 using the trained machine learning platform 160. For example, the user device 116 may transmit the adjusted at least one of the set of mixed reality spaces 140 or the set of view volumes 130 to an external user device, such as one or more of the installer devices 180. The training data may include one or more of an amount of time the user gazes at the first view volume 130, an amount of time the user gazes in the first user gaze direction 112, an amount of time the first user position 114 is fixed, and a number of users currently present in the set of mixed reality spaces 140. In some examples, based on the trained machine learning platform 160, the user device 116 renders a navigation suggestion.

In some examples, each mixed reality space 140 of the set of mixed reality spaces 140 comprises a set of boundaries. Each mixed reality space is adjusted by adjusting the set of boundaries and stored in a network storage 170.

In some examples, each view volume 130 of the set of view volumes 130 comprises a set of points. Each view volume 130 is adjusted by changing the set of points and stored in a network storage 170.

ADDITIONAL EXAMPLES

An example system comprises a processor, and a memory comprising computer program code. The computer program code is configured to, when executed by the processor, cause the processor to: identify a mixed reality space containing a user position of a user; determine a user gaze direction of the user via a user device; identify a view volume intersecting the user gaze direction while the user is in the mixed reality space; determine that the view volume is associated with the mixed reality space; and select a content entity associated with the view volume to render to the user via the user device.

An example computer storage medium comprises a plurality of instructions that, when executed by a processor, cause the processor to: identify a mixed reality space containing a user position of a user; determine a user gaze direction of the user via a user device; identify a view volume intersecting the user gaze direction while the user is in the mixed reality space; determine that the view volume is associated with the mixed reality space; and select a content entity associated with the view volume to render to the user via the user device.

An example computerized method comprises: identifying a mixed reality space containing a user position of a user; determining a user gaze direction of the user via a user device; identifying a view volume intersecting the user gaze direction while the user is in the mixed reality space; determining that the view volume is associated with the mixed reality space; and selecting a content entity associated with the view volume to render to the user via the user device.

An example computerized method comprises: creating a mixed reality space, wherein the mixed reality space comprises a boundary; creating a volume, wherein the volume is a three-dimensional (3D) shape comprising points, and wherein the volume corresponds to a content entity; adjusting the mixed reality space based on movement of the boundary using a user interface of a user device; adjusting a volume based on movement of at least one of the points using the user interface; and sharing the mixed reality space or the volume from the user device to another user device.

Alternatively, or in addition to the other examples described herein, examples include any combination of the following:
- detect an updated user gaze direction of the user; determine an updated view volume that the updated user gaze direction intersects with; and based on determining the updated view volume is same as the identified view volume, continue to render the selected content entity.
- detect an updated user gaze direction of the user; determine an updated view volume that the updated user gaze direction intersects with; and based on determining the updated view volume is different from the view volume and the updated view volume does not belong to the identified mixed reality space, disable the rendered content entity corresponding to the identified view volume.
- detect an updated user gaze direction of the user; determine an updated view volume that the updated user gaze direction intersects with; and based on determining the updated view volume is different from the identified view volume and the updated view volume belongs to a second mixed reality space, rendering an updated content entity corresponding to the updated view volume.
- train a machine learning platform using training data; and adjust the identified mixed reality space or the identified view volume using the trained machine learning platform.
- control a transceiver to transmit the adjusted identified mixed reality space or the identified view volume to an external user device.
- wherein the training data includes one or more of an amount of time the user gazes at the identified view volume, an amount of time the user gazes in the determined user gaze direction, an amount of time the user position is fixed, and a number of users currently present in the identified mixed reality space.
- based on the trained machine learning platform, render a navigation suggestion via the user device.
- wherein the identified mixed reality space comprises a set of boundaries; and wherein the identified mixed reality space is adjusted by adjusting the set of boundaries.
- wherein the adjusted mixed reality space is stored in a network storage.
- wherein the identified view volume comprises a set of points; and wherein the identified view volume is adjusted by changing the set of points.
- wherein the adjusted view volume is stored in a network storage.
- adjusting the mixed reality space includes receiving an input, via the user interface, to manually adjust one or more points of the set of points.
- sharing the mixed reality space or the volume in real-time.
- rendering, on the device, content associated with at least one of the mixed reality space or the volume upon detecting a user gaze direction of a user via the device.

While the aspects of the disclosure have been described in terms of various examples with their associated operations, a person skilled in the art would appreciate that a combination of operations from any number of different examples is also within scope of the aspects of the disclosure.

Exemplary Operating Environment

Figure 9:
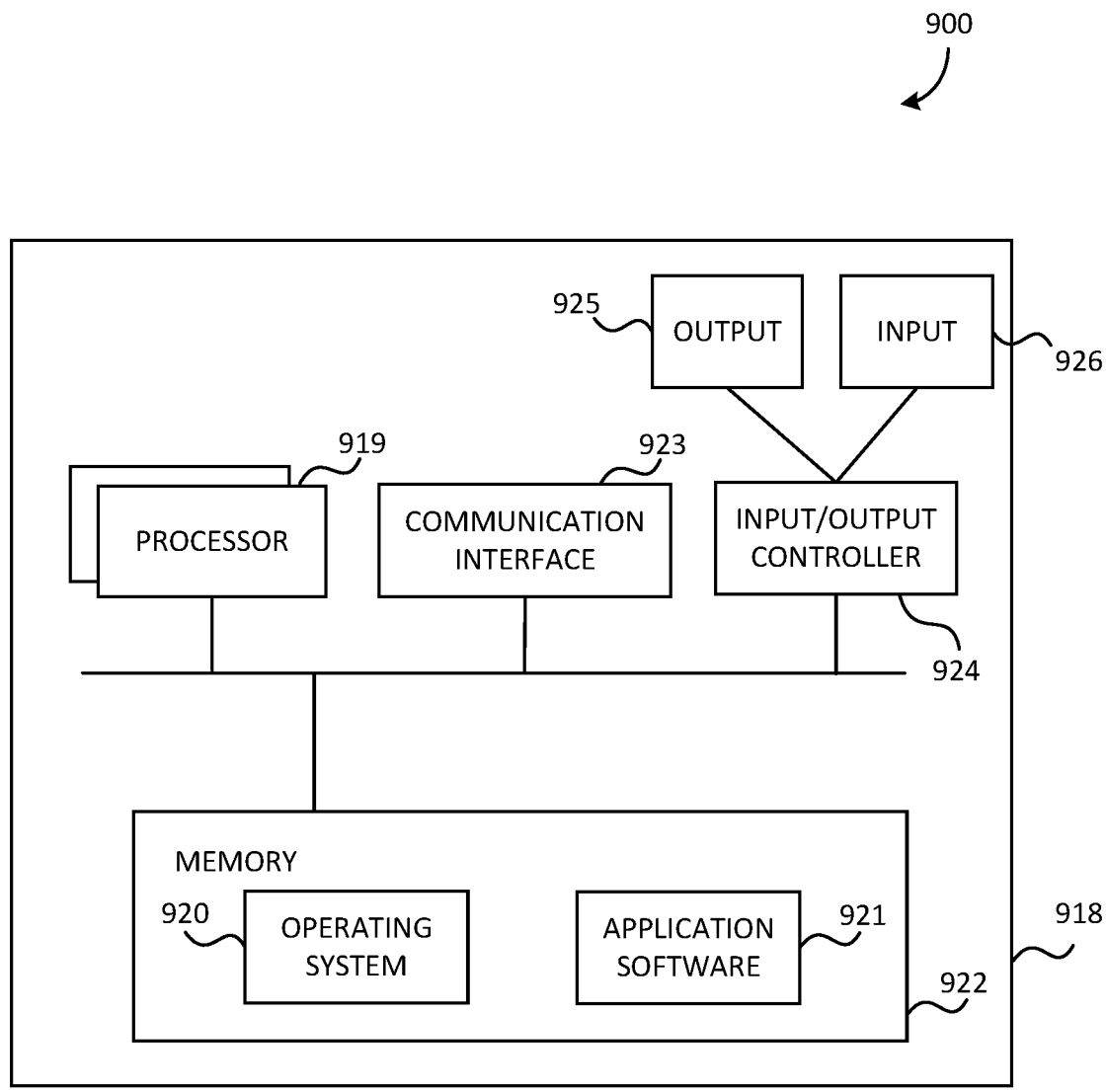
FIG. 9 illustrates an example computing apparatus as a functional block diagram.

The present disclosure is operable with a computing apparatus according to an embodiment as a functional block diagram 900 in FIG. 9. In an example, components of a computing apparatus 918 are implemented as a part of an electronic device according to one or more embodiments described in this specification. The computing apparatus 918 comprises one or more processors 919 which may be microprocessors, controllers, or any other suitable type of processors for processing computer executable instructions to control the operation of the electronic device. Alternatively, or in addition, the processor 919 is any technology capable of executing logic or instructions, such as a hard-coded machine. In some examples, platform software comprising an operating system 920 or any other suitable platform software is provided on the apparatus 918 to enable application software 921 to be executed on the device. In some examples, generating an application template from input content of a content type as described herein is accomplished by software, hardware, and/or firmware.

In some examples, computer executable instructions are provided using any computer-readable media that are accessible by the computing apparatus 918. Computer-readable media include, for example, computer storage media such as a memory 922 and communications media. Computer storage media, such as a memory 922, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 922) is shown within the computing apparatus 918, it will be appreciated by a person skilled in the art, that, in some examples, the storage is distributed or located remotely and accessed via a network or other communication link (e.g., using a communication interface 923).

Further, in some examples, the computing apparatus 918 comprises an input/output controller 924 configured to output information to one or more output devices 925, for example a display or a speaker, which are separate from or integral to the electronic device. Additionally, or alternatively, the input/output controller 924 is configured to receive and process an input from one or more input devices 926, for example, a keyboard, a microphone, or a touchpad. In one example, the output device 925 also acts as the input device. An example of such a device is a touch sensitive display. The input/output controller 924 may also output data to devices other than the output device, e.g., a locally connected printing device. In some examples, a user provides input to the input device(s) 926 and/or receive output from the output device(s) 925.

The functionality described herein can be performed, at least in part, by one or more hardware logic components. According to an embodiment, the computing apparatus 918 is configured by the program code when executed by the processor 919 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a memory comprising computer program code, the computer program code configured to, when executed by the processor, cause the processor to:
   identify a mixed reality space containing a user position of a user;
   determine a user gaze direction of the user via a user device;
   identify a view volume intersecting the user gaze direction while the user is in the mixed reality space;
   determine that the view volume is associated with the mixed reality space;
   select a content entity associated with the view volume to render to the user via the user device;
   detect an updated user gaze direction of the user;
   determine an updated view volume that the updated user gaze direction intersects with; and
   based on determining that the updated view volume is different from the identified view volume and that the updated view volume is associated with the mixed reality space, render an updated content entity corresponding to the updated view volume.

2. The system of claim 1, wherein the computer program code is configured to, when executed by the processor, further cause the processor to:
   based on determining the updated view volume is same as the identified view volume, continue to render the selected content entity.

3. The system of claim 1, wherein the computer program code is configured to, when executed by the processor, further cause the processor to:
   based on determining the updated view volume is different from the view volume and the updated view volume is not associated with the identified mixed reality space, disable the rendered content entity corresponding to the identified view volume.

4. The system of claim 1, wherein the computer program code is configured to, when executed by the processor, further cause the processor to:
   identify a second mixed reality space different from the mixed reality space containing the user position of the user;
   determine that the updated view volume is associated with the second mixed reality space; and
   based on determining the updated view volume is different from the identified view volume and the updated view volume is associated with the second mixed reality space, rendering an updated content entity corresponding to the updated view volume.

5. The system of claim 1, wherein the computer program code is configured to, when executed by the processor, further cause the processor to:
   train a machine learning platform using training data; and
   adjust the identified mixed reality space or the identified view volume using the trained machine learning platform.

6. The system of claim 5, wherein the computer program code is configured to, when executed by the processor, further cause the processor to:
   control a transceiver to transmit the adjusted identified mixed reality space or the identified view volume to an external user device.

7. The system of claim 5, wherein the training data includes one or more of the following:
   an amount of time the user gazes at the identified view volume,
   an amount of time the user gazes in the determined user gaze direction,
   an amount of time the user position is fixed, and
   a number of users currently present in the identified mixed reality space.

8. The system of claim 5, wherein the computer program code is configured to, when executed by the processor, further cause the processor to:
   based on the trained machine learning platform, render a navigation suggestion via the user device.

9. The system of claim 1, wherein:
   the identified mixed reality space comprises a set of boundaries; and
   the identified mixed reality space is adjusted by adjusting the set of boundaries.

10. The system of claim 9, wherein:
    the adjusted mixed reality space is stored in a network storage.

11. The system of claim 1, wherein:
    the identified view volume comprises a set of points; and
    the identified view volume is adjusted by changing the set of points.

12. The system of claim 11, wherein:
    the adjusted view volume is stored in a network storage.

13. A computer storage medium comprising a plurality of instructions that, when executed by a processor, cause the processor to:
    identify a mixed reality space containing a user position of a user;
    determine a user gaze direction of the user via a user device;
    identify a view volume intersecting the user gaze direction while the user is in the mixed reality space;
    determine that the view volume is associated with the mixed reality space;
    select a content entity associated with the view volume to render to the user via the user device;
    detect an updated user gaze direction of the user;
    determine an updated view volume that the updated user gaze direction intersects with; and
    based on determining that the updated view volume is different from the identified view volume and the updated view volume is associated with the mixed reality space, render an updated content entity corresponding to the updated view volume.

14. The computer storage medium of claim 13, further comprising instructions that, when executed by the processor, cause the processor to:

train a machine learning platform using training data; and
adjust the identified mixed reality space or the identified view volume using the trained machine learning platform.

15. The computer storage medium of claim 14, further comprising instructions that, when executed by the processor, cause the processor to:

control a transceiver to transmit the adjusted identified mixed reality space or the identified view volumes to an external user device.

16. The computer storage medium of claim 14, further comprising instructions that, when executed by the processor, cause the processor to:

based on the trained machine learning platform, render a navigation suggestion via the user device.

17. A computer-implemented method comprising:

identifying a mixed reality space containing a user position of a user;
determining a user gaze direction of the user via a user device;
identifying a view volume intersecting the user gaze direction while the user is in the mixed reality space;
determining that the view volume is associated with the mixed reality space;
selecting a content entity associated with the view volume to render to the user via the user device;
detecting an updated user gaze direction of the user;
determining an updated view volume that the updated user gaze direction intersects with; and
based on determining that the updated view volume is different from the identified view volume and the updated view volume is associated with the mixed reality space, rendering an updated content entity corresponding to the updated view volume.

18. The computer-implemented method of claim 17, further comprising:

training a machine learning platform using training data; and
adjusting the identified mixed reality space or the identified view volume using the trained machine learning platform.

19. The computer-implemented method of claim 18, further comprising:

controlling a transceiver to transmit the adjusted identified mixed reality space or the identified view volumes to an external user device.

20. The computer-implemented method of claim 18, further comprising:

based on the trained machine learning platform, rendering a navigation suggestion via the user device.

* * * * *